(12) United States Patent
Jiang et al.

(10) Patent No.: US 11,949,058 B2
(45) Date of Patent: Apr. 2, 2024

(54) BATTERY PIECE FEEDING DEVICE AND SOLDERING STRINGER

(71) Applicant: Wuxi Autowell Technology Co., Ltd., Jiangsu (CN)

(72) Inventors: Xiaolong Jiang, Jiangsu (CN); Kejian Qiu, Jiangsu (CN); Cong Ma, Jiangsu (CN); Chun Feng, Jiangsu (CN)

(73) Assignee: WUXI AUTOWELL TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 18/202,695

(22) Filed: May 26, 2023

(65) Prior Publication Data

US 2023/0387448 A1   Nov. 30, 2023

(30) Foreign Application Priority Data

May 27, 2022   (CN) .......................... 202210585707.8

(51) Int. Cl.
| | | |
|---|---|---|
| *H01M 10/04* | (2006.01) | |
| *B65G 47/04* | (2006.01) | |
| *B65G 47/91* | (2006.01) | |
| *B65G 47/92* | (2006.01) | |

(52) U.S. Cl.
CPC ........ *H01M 10/0404* (2013.01); *B65G 47/04* (2013.01); *B65G 47/918* (2013.01); *B65G 47/92* (2013.01)

(58) Field of Classification Search
None
See application file for complete search history.

(56) References Cited

FOREIGN PATENT DOCUMENTS

| | | | | |
|---|---|---|---|---|
| CN | 09502342 | | 3/2019 | |
| CN | 109502342 A | * | 3/2019 | ............. B23K 37/00 |
| CN | 210587786 U | * | 5/2020 | ............. B23K 37/00 |
| CN | 216288351 | | 4/2022 | |
| CN | 216288351 U | * | 4/2022 | |

* cited by examiner

*Primary Examiner* — Kavel Singh

(57) ABSTRACT

The present disclosure provides a battery piece feeding device and a soldering stringer, the battery piece feeding device is configured to lay battery pieces onto a soldering conveying device, the battery piece feeding device includes two picking mechanisms, both of the picking mechanisms are configured to alternately pick up the battery pieces from a battery piece picking position and lay the picked battery pieces onto the soldering conveying device. When one picking mechanism picks up the battery piece from the battery piece picking position, the other picking mechanism lays the picked battery piece onto the soldering conveying device. By arranging the two picking mechanisms and controlling the two picking mechanisms to alternately pick up the battery pieces from the battery piece picking position and lay the picked battery pieces onto the soldering conveying device, the battery piece feeding device greatly improves the battery piece feeding efficiency.

15 Claims, 6 Drawing Sheets

BATTERY PIECE FEEDING DEVICE AND SOLDERING STRINGER

FIELD OF THE DISCLOSURE

The disclosure relates to the field of battery production, in particular to a battery piece feeding device and a soldering stringer.

BACKGROUND

Before soldering and stringing of battery pieces is performed, the battery pieces stored at a battery piece picking position need to be placed on a soldering conveying device by a battery piece feeding device. The conventional battery piece feeding device only includes one picking mechanism, and its feeding efficiency is low.

BRIEF SUMMARY

To solve the technical problem of low feeding efficiency existing in the conventional battery piece feeding device, the first aspect of the present disclosure provides a battery piece feeding device, and its specific technical scheme is as follows:

A battery piece feeding device configured to lay battery pieces onto a soldering conveying device, comprising two picking mechanisms, a first picking mechanism and a second picking mechanism. Both of the first and second picking mechanisms are configured to alternately pick up battery pieces from a battery piece picking position, and lay the picked battery pieces onto the soldering conveying device, wherein when one picking mechanism, e.g., the first picking mechanism, picks up a first battery piece from the battery piece picking position, the other picking mechanism, e.g., the second picking mechanism, lays a second battery piece, which is already picked, onto the soldering conveying device. The two picking mechanisms 10 can operate alternately to pick up and lay battery pieces in this way simultaneously.

By arranging two picking mechanisms and controlling the two picking mechanisms to alternately pick up battery pieces from the battery piece picking position, and lay the picked battery pieces onto the soldering conveying device, the battery piece feeding device of the present disclosure greatly improves the battery piece feeding efficiency.

In some embodiments, the two picking mechanisms include a moving mechanism and a battery piece picking portion, wherein the battery piece picking portion is connected to a driving end of the moving mechanism, the battery piece picking portion is configured to pick up the battery piece, and the moving mechanism is configured to drive the battery piece picking portion to move.

The moving mechanism drives the battery piece picking portion to move, and the battery piece picking portion realizes the position switching between the battery piece picking position and the soldering conveying device, so as to feed the battery pieces at the battery piece picking position toward the soldering conveying device.

In some embodiments, the moving mechanism includes a first translation mechanism, a lifting mechanism, and a mounting bracket, wherein the lifting mechanism is connected to a driving end of the first translation mechanism, the mounting bracket is connected to a driving end of the lifting mechanism, and the battery piece picking portion is mounted on the mounting bracket, and the first translation mechanism is configured to drive the battery piece picking portion to translate in a first horizontal direction, the first horizontal direction is perpendicular to a conveying direction of the soldering conveying device, and the lifting mechanism drives the battery piece picking portion to lift.

By arranging the first translation mechanism, the battery piece picking portion is driven to translation, so that the battery piece picking portion can move back and forth between the battery piece picking position and the soldering conveying device. By arranging the lifting mechanism, the battery piece picking portion is driven to lift.

In some embodiments, the mounting bracket is provided with a second translation mechanism, the battery piece picking portion is connected to a driving end of the second translation mechanism, and the second translation mechanism is configured to drive the battery piece picking portion to translate in a second horizontal direction, the second horizontal direction is parallel to the conveying direction of the soldering conveying device.

By arranging the second translation mechanism, when the battery piece picking portion moves to the soldering conveying device, the second translation mechanism can drive the battery piece picking portion to translate parallel to the conveying direction of the soldering conveying device, so as to ensure that the battery piece can be accurately placed on the target laying position.

In some embodiments, the picking mechanism further includes a tool picking portion connected to the driving end of the moving mechanism side by side with the battery piece picking portion, and the tool picking portion is configured to pick up a strap pressing tool.

By arranging the tool picking portion, the battery piece feeding device can stack the battery piece and the tape pressing tool on the soldering conveying device at the same time, which improves the production efficiency of the battery string.

In some embodiments, a spacing between the battery piece picking portion and the tool picking portion is configured to be adjustable.

By configuring the spacing between the battery piece picking portion and the tool picking portion to be adjustable, battery pieces of different sizes can be compatible.

In some embodiments, the battery piece picking portion includes a first suction unit configured to suck the battery piece, and/or the tool picking portion includes a second suction unit or an electromagnet to suck the tape pressing tool.

By arranging the battery piece picking portion and the tool picking portion, the battery piece and the strap pressing tool can be sucked respectively.

The present disclosure also provides a soldering stringer comprising the battery piece feeding device according to any one of the described embodiments, a strap pulling device, a soldering conveying device and a soldering device, wherein the battery piece feeding device is configured to lay battery pieces to the soldering conveying device, the strap pulling device is configured to lay a strap segment to the soldering conveying device, and make the strap segment stack on the corresponding battery piece, the soldering conveying device conveys the stacked battery piece and strap segment to a soldering position, and the soldering device is arranged at the soldering position, and is configured to solder the stacked battery piece and strap segment into a string.

Through the cooperation of the battery piece feeding device, the strap pulling device, the soldering conveying device and the soldering device, the soldering stringer can realize the automatic soldering of the battery string.

In some embodiments, the strap pulling device includes a cutter mechanism, a first strap pulling mechanism, a second strap pulling mechanism, and a strap laying mechanism, wherein the first strap pulling mechanism and the second strap pulling mechanism are configured to alternately clamp the strap at a pulling position located upstream of a cutting position and pull the clamped strap to a transfer position located downstream of the cutting position, wherein when the first strap pulling mechanism pulls the clamped strap to the transfer position, the second strap pulling mechanism clamps the strap at the pulling position, and the cutter mechanism cuts the strap at the cutting position to acquire the strap segment, when the second strap pulling mechanism pulls the clamped strap to the transfer position, the first strap pulling mechanism clamps the strap at the pulling position, and the cutter mechanism cuts the strap at the cutting position to acquire the strap segment, the strap laying mechanism is configured to clamp the strap pulled to the transfer position, by the first strap pulling mechanism or the second strap pulling mechanism, and lay the acquired strap segment onto the soldering conveying device.

The strap pulling device is provided with two strap pulling mechanisms, and the two strap pulling mechanisms alternately clamp the strap from the pulling position upstream of the cutter mechanism, and pull the strap to the transfer position downstream of the cutter mechanism. When one of the strap pulling mechanisms pulls the previous section of strap to the transfer position, the other strap pulling mechanism can simultaneously clamp the next section of strap at the pulling position without waiting for the cutter mechanism to cut the strap. In addition, the strap located upstream of the cutter mechanism has been clamped by the strap pulling mechanism at the pulling position, thus the cutter mechanism can cut the strap without waiting for the strap clamping mechanism to clamp the strap. Compared with the conventional strap pulling device, the strap pulling device greatly improves the pulling and laying efficiency of the strap.

The strap laying mechanism includes a third strap pulling mechanism and a fourth strap pulling mechanism, the third strap pulling mechanism and the fourth strap pulling mechanism alternately clamp the strap from the transfer position, and lay the strap segment onto the soldering conveying device.

The third strap pulling mechanism and the fourth strap pulling mechanism alternately clamp the strap from the transfer position, and lay the strap segment onto the soldering conveying device, which further improves the laying efficiency of the strap.

In some embodiments, the strap pulling device further includes a strap holding mechanism arranged between the cutting position and the transfer position, the strap holding mechanism is configured to hold the strap pulled to the transfer position by the first strap pulling mechanism or the second strap pulling mechanism.

By arranging the strap holding mechanism, the holding and supporting of the strap guided to the transfer position is realized, and the falling of the strap is prevented.

In some embodiments, the soldering conveying device includes a base, a stepping platform, a fixed platform and a conveying belt, wherein the stepping platform is movably connected to the base, the fixed platform is fixedly connected to the base, the soldering position is located on the fixed platform, and an upper surface of the fixed platform and an upper surface of the stepping platform are on the same plane, the conveying belt is arranged on the fixed platform and the stepping platform, and the battery piece and the strap segment are stacked on the conveying belt located on the stepping platform, and the conveying belt is configured to convey the stacked predetermined number of battery pieces and strap segments to the soldering position, the stepping platform is configured to be able to step toward or away from the fixed platform, each time a battery piece is stacked on the conveying belt, the stepping platform steps a predetermined distance away from the fixed platform, until the predetermined number of battery pieces are stacked on the conveying belt.

By arranging the stepping platform, during the feeding process, the conveying belt does not need to step toward the soldering position, and a predetermined number of battery pieces can be continuously fed to the laying position on the conveying belt, so that the conveying belt can synchronously step the predetermined number of battery pieces fed on the conveying belt to the soldering position. On the premise of realizing synchronous soldering of a plurality of battery pieces, the heating consistency of each battery piece is ensured, and the soldering effect is improved.

DETAILED DESCRIPTION

In order to make the above described objects, features and advantages of the present disclosure more clearly and easy to understood, the present disclosure will be described in further detail below with reference to the accompanying drawings and specific embodiments.

Before soldering and stringing of battery pieces is performed, the battery pieces stored at a battery piece picking position need to be placed on a soldering conveying device by a battery piece feeding device. The conventional battery piece feeding device only includes one picking mechanism, and its feeding efficiency is low.

Figure 1:
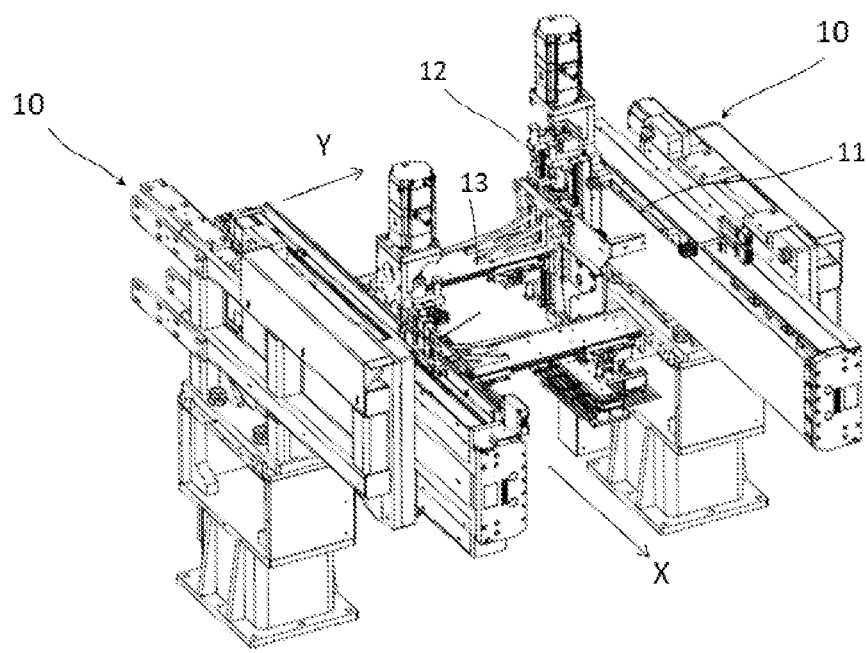
FIG. 1 is a schematic structural view of a battery piece feeding device according to an embodiment of the present disclosure.

In view of this, the present disclosure provides a battery piece feeding device for laying the battery pieces on the soldering conveying device, which can greatly improve the battery piece feeding efficiency. As illustrated in FIG. 1, the battery piece feeding device according to the present disclosure includes two picking mechanisms 10, e.g., the left one may be the first picking mechanism and the right one may be the second picking mechanism. Both of the picking mechanisms 10 are configured to alternately pick up the battery pieces from the battery piece picking position, and lay the picked battery pieces onto the soldering conveying device.

When one picking mechanism 10 moves to the battery piece picking position, the other picking mechanism 10 moves to above the soldering conveying device. In this way, when one picking mechanism 10 picks up a battery piece of the battery pieces from the battery piece picking position, the other picking mechanism 10 lays another already picked battery piece of the battery pieces on the soldering conveying device. The two picking mechanisms 10 can operate alternately to pick up and lay battery pieces in this way simultaneously.

Compared with the conventional battery piece feeding device, the battery piece feeding device of the present disclosure greatly improves the battery piece feeding efficiency.

Figure 2:
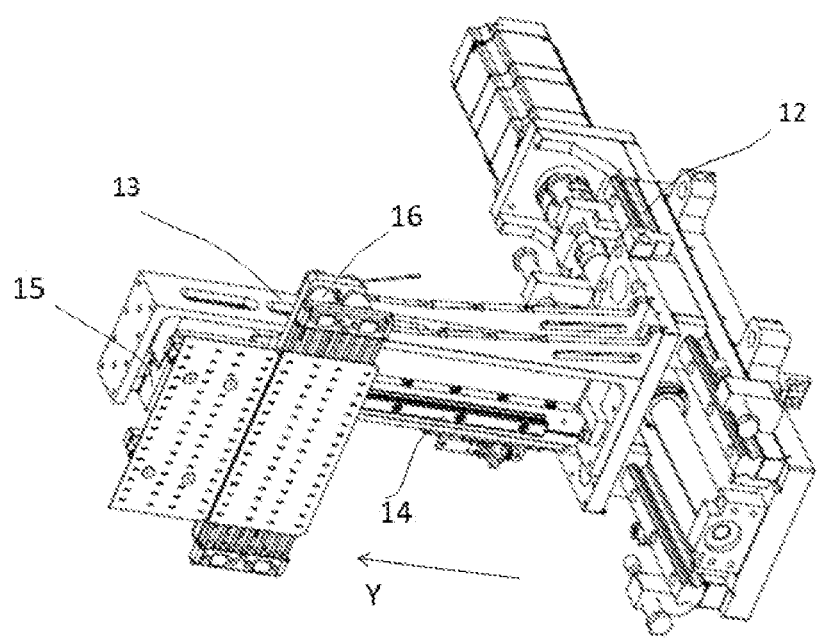
FIG. 2 is a schematic structural view of a picking mechanism according to an embodiment of the present disclosure from a visual angle.
Figure 3:
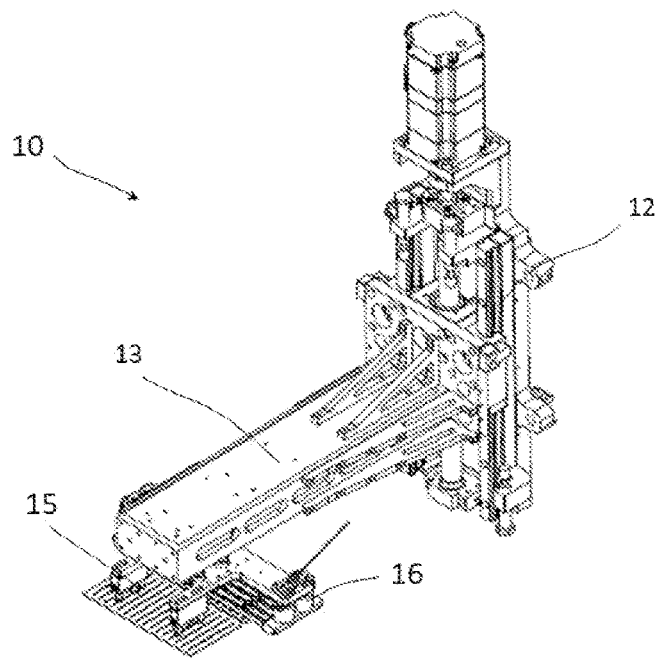
FIG. 3 is a schematic structural view of the picking mechanism according to an embodiment of the present disclosure from another visual angle.

Optionally, as illustrated in FIG. 1 to FIG. 3, the picking mechanism 10 includes a moving mechanism and a battery piece picking portion 15, wherein the battery piece picking portion 15 is connected to a driving end of the moving mechanism, and the moving mechanism is configured to drive the battery piece picking portion to move, so as to realize the position switching of the battery piece picking portion 15 between the battery piece picking position and the soldering conveying device. When the moving mechanism drives the battery piece picking portion 15 to move to the picking position, the battery piece picking portion 15 picks up the battery piece from the battery piece picking position, and when the moving mechanism drives the battery piece picking portion 15 to move to the soldering conveying device, the battery piece picking portion 15 places the battery piece onto the soldering conveying device.

Optionally, the moving mechanism includes a first translation mechanism 11, a lifting mechanism 12 and a mounting bracket 13, wherein the lifting mechanism 12 is connected to a driving end of the first translation mechanism 11, and the mounting bracket 13 is connected to a driving end of the lifting mechanism 12, and the battery piece picking portion 15 is mounted on the mounting bracket 13. The first translation mechanism 11 is configured to drive the battery piece picking portion 15 to translate in a first horizontal direction (X-axis direction in FIG. 1) perpendicular to a conveying direction of the soldering conveying device, and the lift mechanism 12 is configured to drive the battery piece picking portion 15 to lift.

Optionally, as illustrated in FIG. 2, the mounting bracket 13 is further provided with a second translation mechanism 14, the battery piece picking portion is connected to a driving end of the second translation mechanism 14, and the second translation mechanism 14 is configured to drive the battery piece picking portion 15 to translate in a second horizontal direction (Y-axis direction in FIG. 1 and FIG. 2) parallel to the conveying direction of the soldering conveying device.

When the battery piece picking portion 15 is driven by the first translation mechanism 11 to move from the picking position to above the soldering conveying device, the second translation mechanism 14 can drive the battery piece picking portion 15 to translate parallel to the conveying direction of the soldering conveying device, so as to ensure that the battery piece can be accurately placed at the target laying position on the soldering conveying device, and adapt to the laying requirements of different positions.

As known to those skilled in the art, before soldering the battery string, a strap pressing tool needs to be stacked on each battery piece to press the strap onto the battery piece. In the conventional stringing of battery piece, after the laying of the battery piece and the strap is completed, the strap pressing tool is transported to the battery piece by an additional tool transporting device, which not only increases the soldering cost of the battery string, but also reduces production efficiency of the battery string. In view of this, as illustrated in FIG. 2 to FIG. 3, optionally, the picking mechanism 10 in an embodiment of the present disclosure further includes a tool picking portion 16 connected to the driving end of the moving mechanism side by side with the battery piece picking portion 15, tool picking portion 16 is configured to pick up the strap pressing tool. In this way, the picking mechanism 10 can stack the battery piece and the strap pressing tool on the soldering conveying device at the same time, which improves the production efficiency of the battery string.

Optionally, a spacing between the battery piece picking portion 15 and the tool picking portion 16 is configured to be adjustable, so as to ensure that the battery piece picking portion 15 can pick up battery pieces of different sizes, and to ensure that the battery pieces will not touch the strap pressing tool on the tool picking portion 16.

In order to adjust the spacing between the battery piece picking portion 15 and the tool picking portion 16, optionally, the battery piece picking portion 15 and the tool picking portion 16 are installed side by side on one mounting plate, wherein the tool picking portion 16 is fixedly mounted on the mounting plate, the battery piece picking portion 15 is slidably mounted on the mounting plate. Thus, by pushing the battery piece picking portion 15 to slide close to or away from the tool picking portion 16, the spacing between the battery piece picking portion 15 and the tool picking portion 16 can be adjusted.

Optionally, the battery piece picking portion 15 includes a first suction unit, and the battery piece picking portion 15 performs suction on the battery piece through the first suction unit. The tool picking portion 16 includes a second suction unit or an electromagnet, and the tool picking portion 16 performs suction on the strap pressing tool through the second suction unit or the electromagnet.

Figure 4:
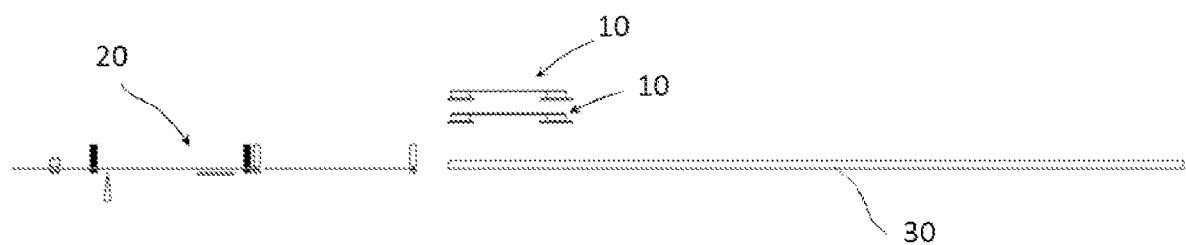
FIG. 4 is a schematic structural view of a soldering stringer according to an embodiment of the present disclosure from a visual angle.
Figure 5:
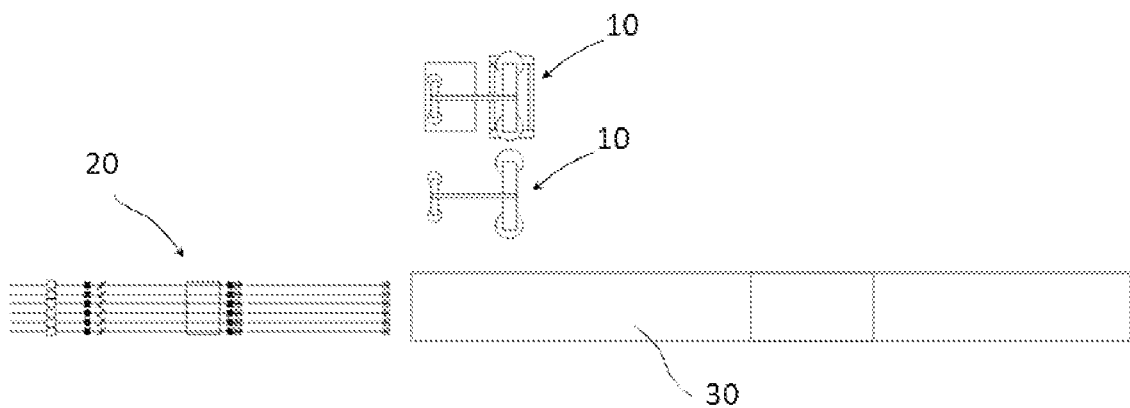
FIG. 5 is a schematic structural view of the soldering stringer according to an embodiment of the present disclosure from another visual angle.

As illustrated in FIG. 4 and FIG. 5, the present disclosure also provides a soldering stringer comprising the battery piece feeding device including two picking mechanisms 10 according to any one of the described embodiments, a strap pulling device 20, a soldering conveying device 30, and a soldering device. Wherein:

The two picking mechanisms 10 of the battery piece feeding device alternately lay the battery pieces to the soldering conveying device 30.

The strap pulling device 20 is configured to lay a strap segment to the soldering conveying device, and make the strap segment stacked on the corresponding battery piece.

The soldering conveying device 30 conveys the stacked battery piece and strap segment to a soldering position.

The soldering device is arranged at the soldering position, and is configured to solder the stacked battery piece and strap segment into a string.

Through the cooperation of the battery piece feeding device, the strap pulling device 20, the soldering conveying device 30 and the soldering device, the soldering stringer can realize the automatic soldering of the battery string.

The conventional strap pulling device pulls the strap as follows: control a pulling mechanism to clamp the strap downstream of a cutter mechanism and pull the strap to a predetermined position, and then control the strap clamping mechanism upstream of the cutter mechanism, and finally control the cutter mechanism to cut the strap to acquire a strap segment. Then, the pulling mechanism is controlled to clamp the strap downstream of the cutter mechanism to pull the next strap.

That is, the cutter mechanism have to wait for the strap clamping mechanism to clamp the strap before executing the cutting of the strap, and the pulling mechanism have to wait for the cutter mechanism to cut the strap before executing the pulling of the next strap. Frequent waiting makes the conventional strap pulling device less efficient in pulling the strap.

In view of this, an embodiment of the present disclosure also provides a new type of strap pulling device, and using the strap pulling device to implement the pulling and laying of the strap can significantly improve the laying efficiency of the strap.

Figure 6:
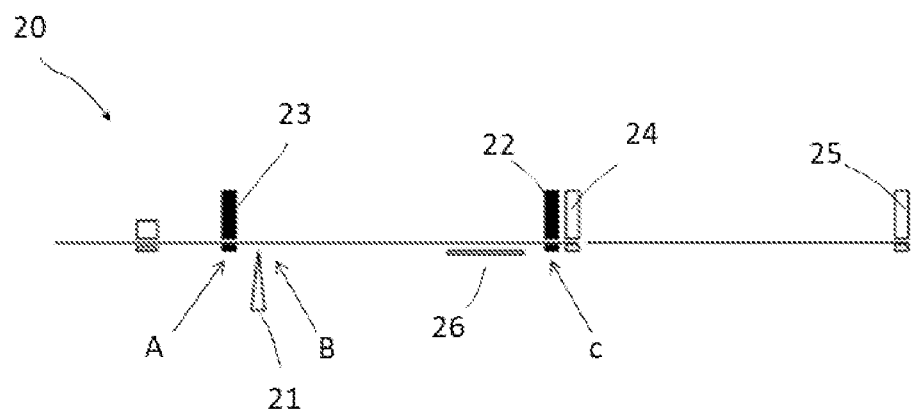
FIG. 6 is a schematic structural view of a strap pulling device in a first working state according to an embodiment of the present disclosure from a visual angle.
Figure 7:
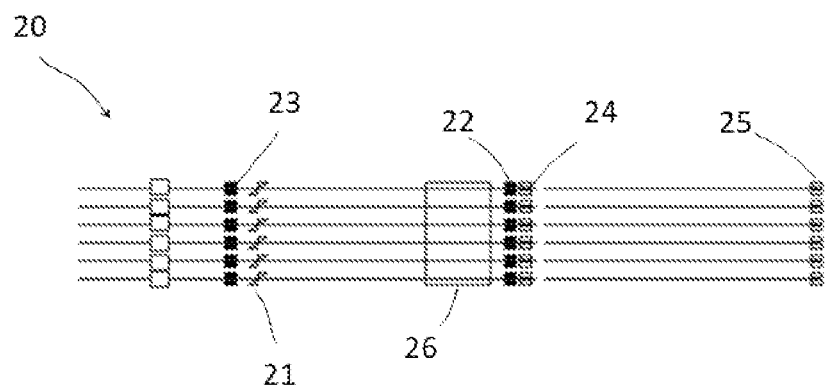
FIG. 7 is a schematic structural view of the strap pulling device in the first working state according to an embodiment of the present disclosure from another visual angle.
Figure 8:
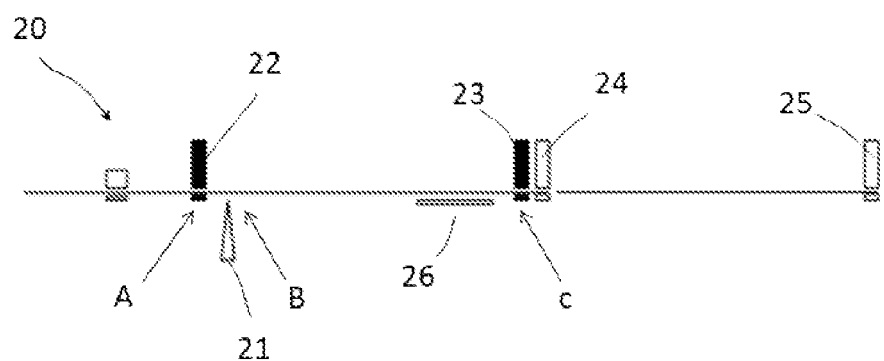
FIG. 8 is a schematic structural view of the strap pulling device in a second working state according to an embodiment of the present disclosure from a visual angle.

As illustrated in FIG. 6 to FIG. 8, the strap pulling device 20 according to an embodiment of the present disclosure includes a cutter mechanism 21, a first strap pulling mechanism 22, a second strap pulling mechanism 23 and a strap laying mechanism. Wherein:

The first strap pulling mechanism 22 and the second strap pulling mechanism 23 are configured to alternately clamp the strap at the pulling position A located upstream of a cutting position B, and pull the clamped strap to a transfer position C located downstream of the cutting position B. Wherein:

When the first strap pulling mechanism 22 pulls the clamped strap to the transfer position C, the second strap pulling mechanism 23 clamps the strap at the pulling position A, and the cutter mechanism 21 cuts the strap at the cutting position B to acquire the strap segment.

When the second strap pulling mechanism 23 pulls the clamped strap to the transfer position C, the first strap pulling mechanism 22 clamps the strap at the pulling position A, and the cutter mechanism 21 cuts the strap at the cutting position B to acquire the strap segment.

In order to enable those skilled in the art to more clearly understand the specific process of alternately pulling the strap by the first strap pulling mechanism 22 and the second strap pulling mechanism 23, the working process of the first strap pulling mechanism 22 and the second strap pulling mechanism 23 will be described in more detail with reference to FIG. 6 and FIG. 8.

Before the strap pulling is officially started, a free end of the strap needs to be pulled and positioned at the pulling position A from the strap coil. Then start to perform the strap pulling operation as follows:

The first strap pulling mechanism 22 clamps the free end of the strap from the pulling position A, and pulls the clamped strap to the transfer position C. At the same time, the second strap pulling mechanism 23 moves to the pulling position A to clamp the strap. At this point, as illustrated in FIG. 6, the second strap pulling mechanism 23 and the first strap pulling mechanism 22 simultaneously clamp the strap from a front side and a rear side of the cutting position B.

The cutter mechanism 21 cuts the strap at the cutting position B, thereby obtaining one strap segment. At this point, a new free end of the strap is clamped in the second strap pulling mechanism 23.

Then, the second strap pulling mechanism 23 pulls the clamped strap to the transfer position C. At the same time, the first strap pulling mechanism 22 releases the strap segment, moves to the pulling position A and clamps the strap segment. At this point, as illustrated in FIG. 8, the first strap pulling mechanism 22 and the second strap pulling mechanism 23 simultaneously clamp the strap from the front side and the rear side of the cutting position B.

The cutter mechanism 21 cuts the strap at the cutting position B, thereby obtaining another strap segment. At this point, a new free end of the strap is clamped in the first strap pulling mechanism 22.

By repeatedly performing the pulling and cutting process described above, the strap segments can be acquired alternately, and the strap segments can be pulled to the transfer position C.

It can be seen that, in the strap pulling device according to an embodiment of the present disclosure, the first strap pulling mechanism 22 and the second strap pulling mechanism 23 alternately clamp the strap from the pulling position A upstream of the cutter mechanism 21, and pull the strap to the transfer position C downstream of the cutter mechanism 21. In particular, when one of the strap pulling mechanisms pulls the previous section of strap to the transfer position C, the other strap pulling mechanism can simultaneously clamp the next section of strap at the pulling position A without waiting for the cutter mechanism to cut the strap. In addition, the strap located upstream of the cutter mechanism 21 has been clamped by the strap pulling mechanism at the pulling position A, thus the cutter mechanism 21 can cut the strap without waiting for the strap clamping mechanism to clamp the strap.

The strap laying mechanism is configured to clamp the strap pulled to the transfer position C, by the first strap pulling mechanism 22 or the second strap pulling mechanism 23, and lay the acquired strap segment onto the soldering conveying device 30.

That is, when the first strap pulling mechanism 22 and the second strap pulling mechanism 23 pull the strap to the transfer position C, the strap laying mechanism receives and clamps the free end of the strap, and then pull the strap segment acquired by cutting to lay onto the soldering conveying device 30. Of course, when the strap laying mechanism clamps the strap, the strap may or may not have been cut.

Continuing to refer to FIG. 6 to FIG. 8, in order to receive and lay the straps pulled by the first strap pulling mechanism 22 and the second strap pulling mechanism 23 in time, and improve the transmission efficiency. Optionally, the strap laying mechanism includes a third strap pulling mechanism 24 and a fourth strap pulling mechanism 25, the third strap pulling mechanism 24 and the fourth strap pulling mechanism 25 are alternately clamp the strap from the transfer position C, and pull and lay the strap segment onto the soldering conveying device 30.

Optionally, the strap pulling device further includes a strap holding mechanism 26 arranged between the cutting position B and the transfer position C. When the first strap pulling mechanism 22 and the second strap pulling mechanism 23 pull the strap to the transfer position C, the strap holding mechanism 26 holds the strap upward, so as to support the strap and prevent the falling of the strap. Optionally, a strap guide groove is provided on the bearing surface of the strap holding mechanism 26, and the strap guiding groove is configured to guide the strap and prevent the strap from being horizontally displaced.

As known to those skilled in the art, the conventional soldering conveying device only includes a soldering platform on which a conveying belt is sheathed. The conveying belt is driven by a stepping motor. In order to ensure that the conveying belt near the laying position of the battery piece feeding device remains unloaded to place the next battery piece, every time the battery piece feeding device places the current battery piece at the laying position, the stepping motor drives the conveying belt to step towards the soldering position once, and the distance of each step is approximately the width of one battery piece.

The soldering device waits until all the predetermined number of battery pieces arrive at the soldering position before performing the soldering action. The conventional soldering conveying device has the following problems: the battery pieces that arrive at the soldering position first need to wait for the battery pieces that arrive later, the heating time of the battery pieces that arrive first is obviously longer than that of the battery pieces that arrive later, and the heating difference between the battery pieces leads to poor soldering effect. In addition, during the soldering process, the soldering conveying device cannot continuously feed, which affects the feeding efficiency of the battery pieces.

To solve this problem, an embodiment of the present disclosure also provides a new type of soldering conveying device. By using the soldering conveying device to convey the battery piece and the strap, a predetermined number of battery pieces fed on the soldering conveying device can be synchronously conveyed to the soldering position, thus the heating consistency of each battery piece is ensured, and the soldering effect is improved.

Figure 9:
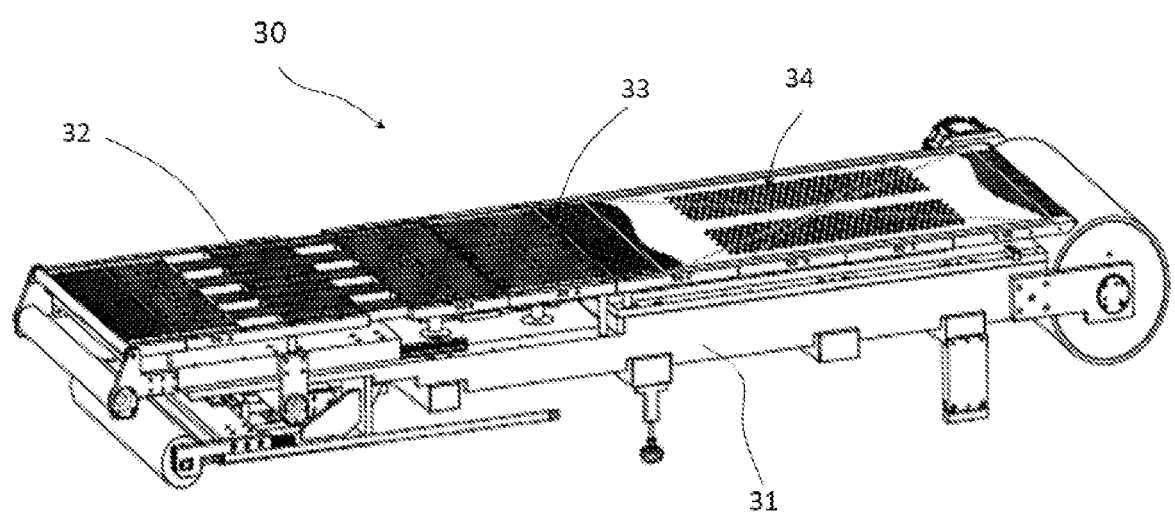
FIG. 9 is a schematic structural view of a soldering conveying device according to an embodiment of the present disclosure.

As illustrated in FIG. 9, the soldering conveying device 30 according to an embodiment of the present disclosure includes a base 31, a stepping platform 32, a fixed platform 33, and a conveying belt 34.

The stepping platform 32 is movably connected to the base 31, the fixed platform 33 is fixedly connected to the base 31, the soldering position is located on the fixed platform 33, and an upper surface of the fixed platform 33 and an upper surface of the stepping platform 32 are on the same plane.

The conveying belt 34 is arranged on the fixed platform 33 and the stepping platform 32, and the battery piece and the strap segment are stacked on the conveying belt 34 located on the stepping platform 32.

After the stacking of a predetermined number of battery pieces is completed, the conveying belt 34 transports the stacked battery pieces and strap segment to the soldering position at one time.

To realize stacking the predetermined number of battery pieces on the conveying belt 4, in particular, the stepping platform 32 is configured to be able to step toward or away from the fixed platform 33.

In the process of stacking the predetermined number of battery pieces, each time a battery piece is stacked, the stepping platform 32 steps a predetermined distance away from the fixed platform 33, so that the conveying belt 34 at the laying position is restored to an unloaded state to receive the next battery piece to be stacked. The predetermined distance that the stepping platform 32 steps away from the fixed platform 33 each time matches the width of one battery piece.

The two picking mechanisms 10, the third strap pulling mechanism 24 and the fourth strap pulling mechanism 25 alternately stack the battery pieces and the strap segments on the conveying belt 34 until the predetermined number of battery pieces are stacked.

After the stacking of the predetermined number of battery pieces is completed, the stepping platform 32 steps back toward the fixed platform 33, and the conveying belt 34 transports the stacked battery pieces and strap segments as a whole to the soldering position.

Then, the stepping platform 32 steps away from the fixed platform 33 again, and starts stacking the predetermined number of battery pieces in the next batch.

By arranging the stepping platform 32 that can step toward or away from the fixed platform 33, during the stacking process of the battery pieces, the stepping platform 32 will step away from the fixed platform 33 by a predetermined distance every time the stacking of one battery piece is completed. In this way, it can be ensured that after the stacking of the current battery piece is completed, the conveying belt 34 at the laying position is immediately restored to the unloaded state, so as to smoothly implement the stacking of the next battery piece.

Therefore, by using the soldering conveying device in this embodiment, during the feeding process, the conveying belt 34 does not need to step toward the soldering position, and a predetermined number of battery pieces can be continuously fed onto the conveying belt 34, so that the predetermined number of the battery pieces fed onto the conveying belt 34 can be synchronously conveyed to the soldering position, thus the heating consistency of each battery piece is ensured, and the soldering effect is improved.

The disclosure has been described above in sufficient detail with certain particularities. Those of ordinary skill in the art should understand that the descriptions in the embodiments are only exemplary, and all changes made without departing from the true spirit and scope of the present disclosure should belong to the protection scope of the present disclosure. The claimed scope of the present disclosure is defined by the claims, rather than by the above description in the embodiments.

REFERENCE SIGNS LIST

In FIG. 1 to FIG. 9:
10 picking mechanism; 11 first translation mechanism; 12 lifting mechanism; 13 mounting bracket; 14 second translation mechanism; 15 battery piece picking portion; 16 tool picking portion;
20 strap pulling device; 21 cutter mechanism; 22 first strap pulling mechanism; 23 second strap pulling mechanism; 24 third strap pulling mechanism; 25 fourth strap pulling mechanism;
30 soldering conveying device; 31 base; 32 stepping platform; 33 fixed platform; 34 conveying belt;
A pulling position; B cutting position; C transfer position.

What is claimed is:

1. A battery piece feeding device configured to lay battery pieces onto a soldering conveying device, characterized in that
the battery piece feeding device includes a first picking mechanism and a second picking mechanism, and both of the first and second picking mechanisms are configured to alternately pick up the battery pieces from a battery piece picking position, and lay the battery pieces onto the soldering conveying device, wherein the first and second picking mechanisms include a moving mechanism, a battery piece picking portion and a tool picking portion, wherein the battery piece picking portion is connected to a driving end of the moving mechanism, the battery piece picking portion is configured to pick up the battery pieces, and the moving mechanism is configured to drive the battery piece picking portion to move, the battery piece picking portion being moveable relative to the tool picking portion such that a spacing between the battery piece picking portion and the tool picking portion is adjustable, wherein the tool picking portion is configured to pick up a strap pressing tool, and wherein the first picking mechanism is configured to pick up a first battery piece of the battery pieces from the battery piece picking position, and wherein the second picking mechanism is configured to lay a second battery piece of the battery pieces onto the soldering conveying device.

2. The battery piece feeding device according to claim 1, characterized in that the moving mechanism includes a first translation mechanism, a lifting mechanism and a mounting bracket, wherein the lifting mechanism is connected to a driving end of the first translation mechanism, the mounting bracket is connected to a driving end of the lifting mechanism, and the battery piece picking portion is mounted on the mounting bracket, and the first translation mechanism is configured to drive the battery piece picking portion to translate in a first horizontal direction, the first horizontal direction is perpendicular to a conveying direction of the soldering conveying device, and the lifting mechanism is configured to drive the battery piece picking portion to lift.

3. The battery piece feeding device according to claim 2, characterized in that the mounting bracket is provided with a second translation mechanism, the battery piece picking portion is connected to a driving end of the second translation mechanism, the second translation mechanism is configured to drive the battery piece picking portion to translate in a second horizontal direction, and the second horizontal direction is parallel to the conveying direction of the soldering conveying device.

4. The battery piece feeding device according to claim 1, characterized in that the battery piece picking portion includes a first suction unit configured to suck the battery pieces, and the tool picking portion includes a second suction unit or an electromagnet configured to suck the strap pressing tool.

5. The battery piece feeding device according to claim 1, characterized in that the battery piece picking portion includes a first suction unit configured to suck the battery pieces.

6. The battery piece feeding device according to claim 1, characterized in that the tool picking portion includes a second suction unit or an electromagnet configured to suck the strap pressing tool.

7. The battery piece feeding device according to claim 1, wherein the first picking mechanism is configured to pick up the first battery piece and the second picking mechanism is configured to lay the second battery piece simultaneously.

8. The battery piece feeding device according to claim 1, wherein the battery piece picking portion being moveable relative to the tool picking portion includes being slidably moveable relative to the tool picking portion.

9. A soldering stringer, comprising:
a soldering conveying device; and
a battery piece feeding device configured to lay battery pieces onto the soldering conveying device, characterized in that
the battery piece feeding device includes a first picking mechanism and a second picking mechanism, and both of the first and second picking mechanisms are configured to alternately pick up the battery pieces from a battery piece picking position, and lay the battery pieces onto the soldering conveying device, wherein the first and second picking mechanisms include a moving mechanism, a battery piece picking portion and a tool picking portion, wherein the battery piece picking portion is connected to a driving end of the moving mechanism, the battery piece picking portion is configured to pick up the battery pieces, and the moving mechanism is configured to drive the battery piece picking portion to move, the battery piece picking portion being moveable relative to the tool picking portion such that a spacing between the battery piece picking portion and the tool picking portion is adjustable, wherein the tool picking portion is configured to pick up a strap pressing tool, and wherein the first picking mechanism is configured to pick up a first battery piece of the battery pieces from the battery piece picking position, and wherein the second picking mechanism is configured to lay a second battery piece of the battery pieces onto the soldering conveying device.

10. The soldering stringer according to claim 9, characterized in that the moving mechanism includes a first translation mechanism, a lifting mechanism and a mounting bracket, wherein the lifting mechanism is connected to a driving end of the first translation mechanism, the mounting bracket is connected to a driving end of the lifting mechanism, and the battery piece picking portion is mounted on the mounting bracket, and the first translation mechanism is configured to drive the battery piece picking portion to translate in a first horizontal direction, the first horizontal direction is perpendicular to a conveying direction of the soldering conveying device, and the lifting mechanism is configured to drive the battery piece picking portion to lift.

11. The soldering stringer according to claim 10, characterized in that the mounting bracket is provided with a second translation mechanism, the battery piece picking portion is connected to a driving end of the second translation mechanism, the second translation mechanism is configured to drive the battery piece picking portion to translate in a second horizontal direction, and the second horizontal direction is parallel to the conveying direction of the soldering conveying device.

12. The soldering stringer according to claim 9, characterized in that the battery piece picking portion includes a first suction unit configured to suck the battery pieces, and the tool picking portion includes a second suction unit or an electromagnet configured to suck the strap pressing tool.

13. The soldering stringer according to claim 9, characterized in that the battery piece picking portion includes a first suction unit configured to suck the battery pieces.

14. The soldering stringer according to claim 9, characterized in that the tool picking portion includes a second suction unit or an electromagnet configured to suck the strap pressing tool.

15. The soldering stringer according to claim 9, wherein the first picking mechanism is configured to pick up the first battery piece and the second picking mechanism is configured to lay the second battery piece simultaneously.

* * * * *